United States Patent [19]

Rohringer

[11] Patent Number: 5,248,220
[45] Date of Patent: Sep. 28, 1993

[54] PROTECTIVE LINER SYSTEM HAVING IMPROVED LEAK DETECTION MEANS

[75] Inventor: Ernst Rohringer, Hilgert, Fed. Rep. of Germany

[73] Assignee: Steuler Industriewerke G.m.b.H., Höhr Grenzhausen, Fed. Rep. of Germany

[21] Appl. No.: 863,149

[22] Filed: Apr. 2, 1992

Related U.S. Application Data

[63] Continuation of Ser. No. 494,996, Mar. 16, 1990, abandoned.

[51] Int. Cl.⁵ .............. E02D 31/00; B65G 5/00
[52] U.S. Cl. .................... 405/53; 405/128; 405/150.1
[58] Field of Search .............. 405/50, 53, 54, 55, 405/128, 129, 150.1; 73/49.2; 220/445, 464, 466, 469; 264/317

[56] References Cited

U.S. PATENT DOCUMENTS

| | | | |
|---|---|---|---|
| 3,990,249 | 11/1976 | Senn | 405/150 X |
| 4,535,518 | 8/1985 | Jaqua | 264/317 X |
| 4,610,120 | 9/1986 | Canavesi et al. | 405/150 X |
| 4,733,989 | 3/1988 | Harriett | 405/50 X |
| 4,744,137 | 5/1988 | Palazzo | 73/49.2 X |
| 4,787,772 | 11/1988 | Wagner | 405/53 |
| 4,815,892 | 3/1989 | Martin | 405/50 X |
| 4,844,287 | 7/1989 | Long | 405/54 X |
| 4,875,361 | 10/1989 | Sharp | 73/49.2 |
| 4,913,310 | 4/1990 | Sharp | 220/445 |
| 4,917,537 | 4/1990 | Jacobson | 405/270 X |
| 4,918,978 | 4/1990 | Green | 73/49.2 |
| 4,920,786 | 5/1990 | Danielson | 73/49.2 |

Primary Examiner—David H. Corbin
Attorney, Agent, or Firm—Kenyon & Kenyon

[57] ABSTRACT

The invention provides a liner sheet, liner panel system, and method for making same that employ a substantially continuous passage that enhances leak detection and thermal insulation in fluid-containment structures, e.g., double-wall tanks.

34 Claims, 4 Drawing Sheets

PROTECTIVE LINER SYSTEM HAVING IMPROVED LEAK DETECTION MEANS

This is a continuation of application Ser. No. 07/494,996 filed on Mar. 16, 1990, now abandoned.

FIELD OF THE INVENTION

The present invention relates to a protective liner system for fluid-containment structures including means for rapidly detecting leaks therein, as well as methods for making and using the liner system.

BACKGROUND OF THE INVENTION

The use of liner systems to protect fluid-containment structures is well-known in the art. Concrete structures or substrates which are in contact with or are immersed in corrosive environments have a particularly great need for such a protective liner system. In the past, sheet liner systems have been used to protect such structures. Conventional sheet liner systems often consisted of rigid plastic, rubber or other sheet material, which were welded together and applied on site.

Systems for detecting accidental leakage of fluids from protective liner systems in fluid-containment structures such as, tanks, towers, dumps, sewage pipes, and trenches, protected by such mechanically anchored liner systems, have monitored the hairline space created between the protective liner and concrete structure, by differences in thermal expansion of the materials. However, this approach has not proven completely effective or reliable enough for modern fluid-containment structures and can make it difficult to locate certain types of leak for repair quickly enough.

Since early detection of leaks in a liner system can help minimize destruction of the concrete structure by leaked corrosive materials ad to reduce associated ground water contamination, improvements in the operation and reliability of leak detection and means for locating such leaks are highly desirable.

ADVANTAGES AND SUMMARY OF THE INVENTION

An advantage of the present invention is that it provides protective liner systems including simple, fast and reliable leak detecting means that, preferably, can help indicate the location of a leak.

Another advantage of the present invention is that it provides a improved thermal insulation between a fluid-containment structure and protective liner disposed therein.

The present invention provides a liner sheet for a fluid-containment structure, comprising: a sheet having a means for attachment to the structure on a surface thereof; and a spacer means for providing a substantially continuous narrow passage for leaked fluid between said sheet and the structure. Preferably, the means for attachment comprises anchors for embedment in concrete protruding from a surface of the sheet.

The spacer means may be any means which performs the function of providing a substantially continuous passage between the sheet and the containment structure, after the sheet has been attached to the structure, e.g., channels in or protrusions on the surface of the sheet closest the structure, or a support webbing provided with openings through which the attachment means can pass, or more even preferably, an easily removable layer. When the fluid containment structure employs poured concrete or a mortar bed to fasten the attachment means, e.g., knobs of the liner sheet, the spacer means prevents the concrete or mortar from completely filling the space between it and the liner sheet and may support the liner sheet so that pressure from the fluid in the containment structure does not collapse the passage. It should be understood that the various spacer means disclosed herein can be used in combination with each other.

The present invention also provides a liner system comprising a plurality of the above-described sheets provided with connectors that are adapted to join the sheet edges and form a fluid-tight seal between joined sheets.

The invention also provides a method for forming a substantially continuous passage between opposing surfaces of a liner sheet and containment structure comprising the steps of: (a) attaching a liner sheet to a containment structure; (b) providing a spacer means therebetween that forms a substantially continuous passage.

In one embodiment, the substantially continuous passage is formed by a spacer means comprising an removable layer applied on a surface of a liner sheet which includes an attachment means for securing the sheet to a fluid-containment structure. After installation the removable layer can be easily removed from its position between the sheet and the structure by application of chemicals or heat which converts the layer to a liquid that can be drained away leaving the desired substantially continuous passage.

The liner panel system may also include leak detector means, e.g., fluid sensors, well known in the art. The leak detector means may be placed in certain advantageous locations, within the substantially continuous passage, to which leaking liquids can be easily drained. The substantially continuous passage can also be partitioned or divided into zones and individual or separate leak detector means associated with each zone so that the presence and approximate location of a leak may be quickly and easily ascertained.

For example, the leak detector means may be positioned at the lowest point in each zone so that a leakage in a particular zone flows to the leak detector means aided by gravity. A plurality of the leak detectors may be positioned in an array, e.g., within a zone, so that a leakage within that zone flows first to the leak detector means closest the leak, and subsequently to the other leak detector means in that zone (moving away from a leak) to aids rapid location of the leak.

The substantially continuous passage of the present invention allows reliable detection of a protective liner failure because it assures that leaked fluid will reach a leak detector means quickly. In some cases it may be advantageous to pressurize or fill the passage near a suspected leak with a second fluid to drive the leaked fluid through the passage toward a leak detector means. Another advantage of the passage is that it provides thermal insulation between the protective liner system and structure.

The preferred thickness of the passage for most double-wall fluid-containment structures ranges from about 1 mm to about 10 mm, and more preferably, about 2 mm to about 5 mm but could range up to 20 mm.

In those embodiments where the spacer means is a removable layer, a variety of materials may be used to form the layer including paraffin, and low melting point resins or styrofoam materials.

In accordance yet another embodiment of the present invention, the spacer means may also include a plurality of small protrusions. These small protrusions may participate in forming the substantially continuous passage and serve to ensure that a passage is maintained after the removable layer has been liquefied and removed. The protrusions also ensure that a passage having a well-defined, substantially uniform, depth is present during and after attachment of the liner panel to a fluid-containment structure. The protrusions may be embedded in the removable layer between the liner sheet and structure and will remain in the passage formed after the removal of the spacer means. These protrusions may be an integral part of the liner sheet, i.e., the liner sheet may be "profiled," or may be separate from the liner sheet. A portion of the protrusions may also be embedded in the fluid-containment structure.

In another embodiment of the invention, there is a support webbing positioned on the same side or surface of the liner sheet as the attachment means. This support webbing has a profile, e.g., protrusions along its surface which ensure that a passage is maintained between the liner sheet and the structure. In accordance with this embodiment, the support webbing may also include a plurality of additional small protrusions to assist in maintaining a well-defined passage. These additional protrusions may be an integral part of the support webbing or may be separate pieces.

In yet another embodiment the spacer means comprises a flexible sheet material having openings through which the attachment means, e.g., knobs, can pass. Preferably, the openings are sized so that the surrounding flexible sheet rests on a shoulder or base portion of the attachment means so that a substantially continuous passage is formed between the flexible sheet and liner sheet after concrete, mortar or the like has been packed around the attachment means. The flexible sheet can also be provided with a profile (shape) or small protrusions to aid in forming the substantially continuous passage.

An important aspect of the invention is the provision of a well-defined substantially continuous passage between the surface of the structure and the liner sheets of a double-wall fluid containment structure. The passage may be produced by use of a removable layer of predetermined thickness applied to the back of a protective liner sheet or to the structure or otherwise interposed therebetween. The removable layer may be removed by any means as described herein. Alternatively, the passage may be formed using a spacer means comprising a flexible sheet attached to the back side of the liner sheet. The support webbing is provided with protrusions which define the width or thickness of the passage.

The invention is described in greater detail below with reference to the embodiment illustrated in the drawings.

DETAILED DESCRIPTION OF THE INVENTION

Figure 1:
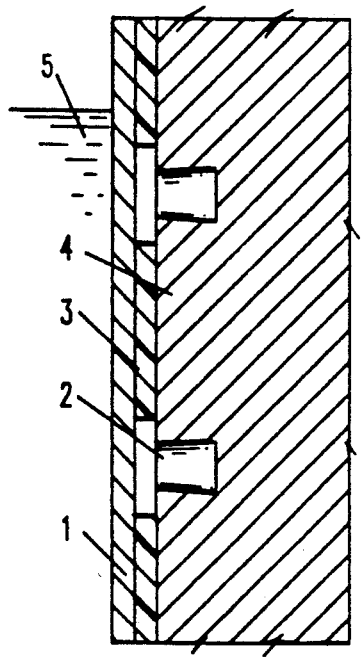
FIG. 1 is a cross sectional view through a lined structure (representing a portion of a concrete fluid-containment structure) with the removable layer spacer means present.

As shown in FIG. 1, the liner sheet (1) is embedded into the structure (4) via attachment means, e.g., affixing knobs (2). If the structure is made of concrete, the affixing knobs (2) are positioned before the concrete is poured. The liner sheet (1) serves to protect the substrate from attack of corrosive liquid material (5), e.g., liquid or gas. A removable layer (3) is shown between the liner sheet (1) and the structure (4), i.e., not in a melted or dissolved state. It should be understood that the affixing knobs (2) are merely an exemplary attachment means and not a material part of the broad invention.

Figure 2:
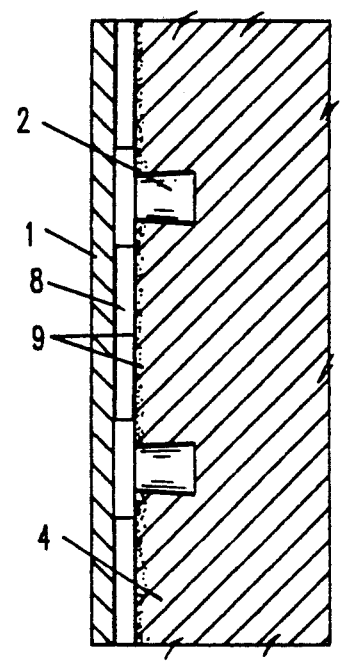
FIG. 2 is a cross sectional view through the lined structure of FIG. 1 without the spacer means showing the resulting passage; and the structure surface which has been coated or impregnated with some of the material which constituted the removable layer.

In FIG. 2, the removable layer (3) has been removed so that the desired substantially continuous passage (8) has been formed. The removable layer (3) can be removed by any means, e.g., by heating or chemically dissolving. It is advantageous to choose a removable layer (3) material, e.g., paraffin, that leaves a protective coating (9) on the surfaces that define the passage (8).

Figure 3:
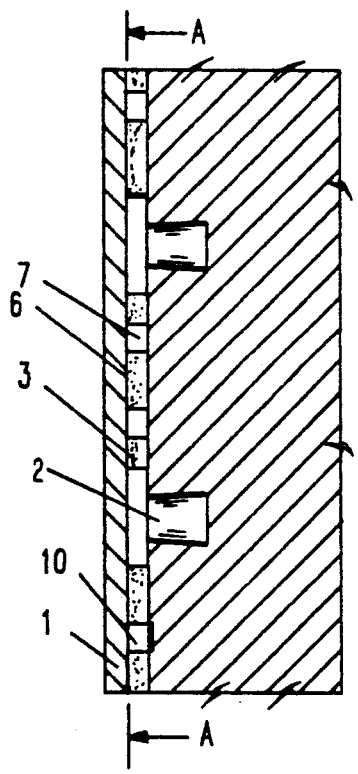
FIG. 3 is a cross-sectional view through a lined structure with a removable layer present and showing embedded protrusions.

FIG. 3 depicts the embodiment including a support webbing (6) in which small protrusions (7) are embossed. After the removal of the removable layer (3) which forms passage (8), the small protrusions (7) as well as the support webbing (6) remain in place. The small protrusions (7) may be an integral part of or attached to the support webbing (6). In addition or alternatively, similar protrusions may be provided on the surface of the liner panel sheet (1).

The protrusions (7) may be positioned such that they protrude (10) somewhat from the removable layer (3) so that they can be embedded in the structure (4) and thereby their movement is restricted. Protrusions (7) also serve to maintain the substantially continuous passage (8) when the pressure of corrosive liquid (5) in the fluid containment structure would otherwise push liner sheet (1) into contact with concrete (4). The height of the protrusions (7) can range from 1–20 mm.

Figure 3A:
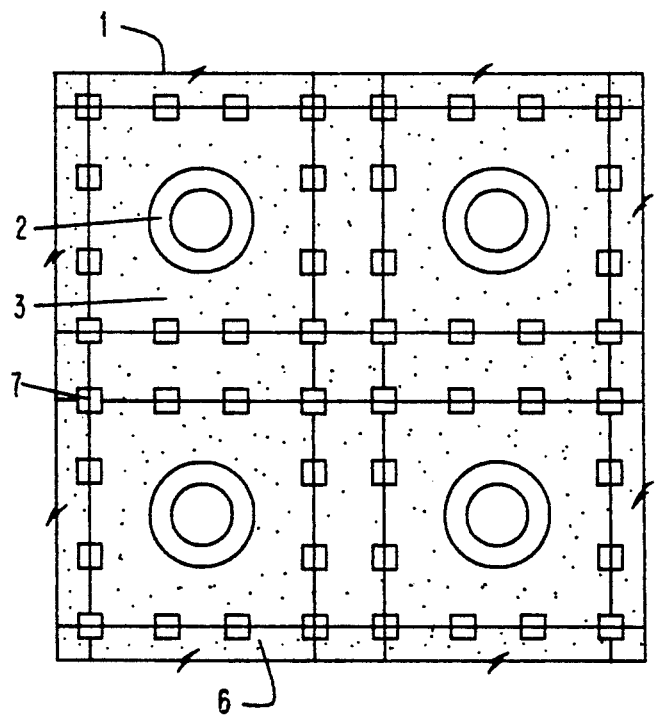
FIG. 3A represents a view of FIG. 3 along line-A.

FIG. 3A illustrates a top plan view of a liner sheet (1) having a support webbing (6) including protrusions (7) disposed thereon. The size of the passage (8) between the inner sheet (1) and the substrate surface (4) in this embodiment will be determined by the protrusions (7) positioned between the affixing knobs (2).

Figure 4:
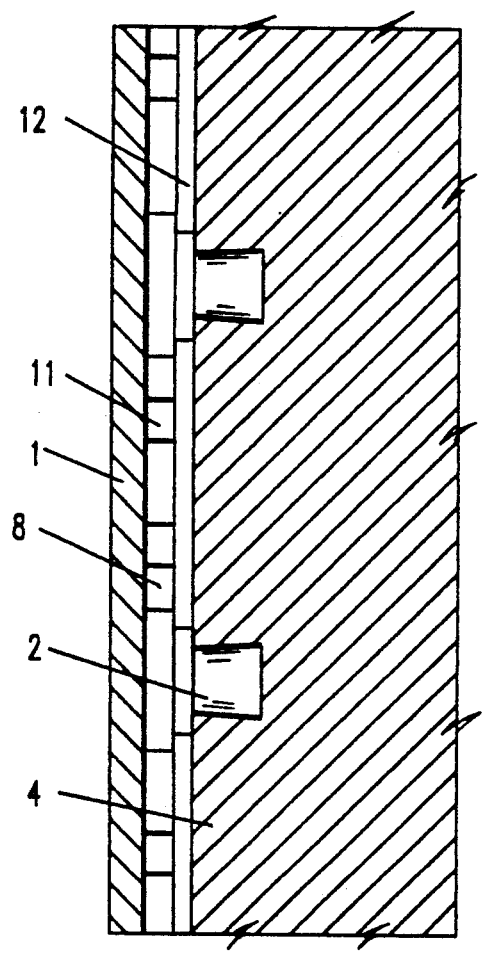
FIG. 4 is a cross-sectional view through a lined structure with a spacer means between the liner sheet and the structure comprising a support webbing with small protrusions.

As shown in FIG. 4, the spacing (8) may be formed by using a flexible sheet material (12) with properly placed protrusions (11). The flexible sheet may be fastened to the liner panel (1) that includes knobs (2) for attachment to structure (4). Placement of the small protrusions (11) can be accomplished by providing a profile to the liner sheet (1), the flexible sheet (12), or both. In this case, the removable layer is not required, since the proper size passage is ensured by the protrusions on one or both sheets and the flexible sheet (12) draped between them.

Figure 5:
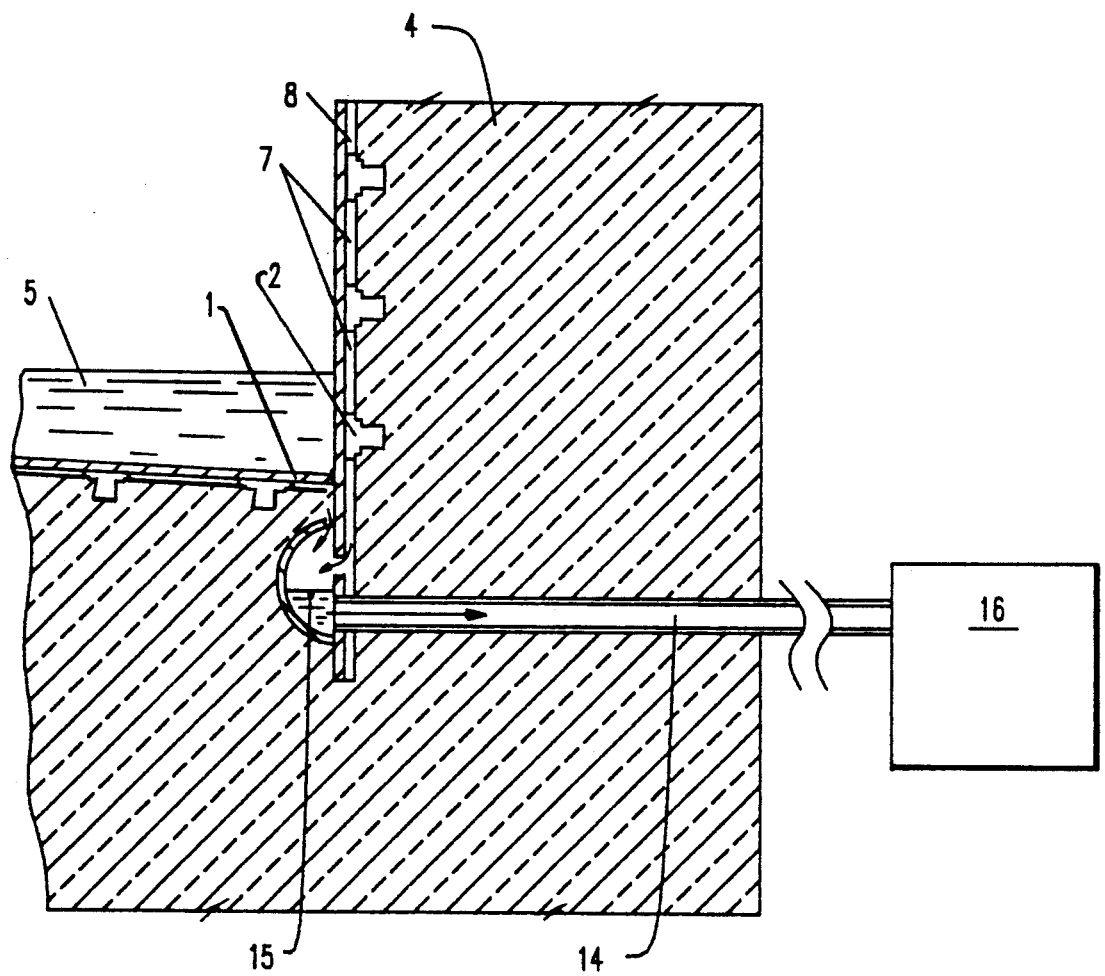
FIG. 5 is a cross-sectional view through a lined structure showing a leak detector means.
Figure 6:
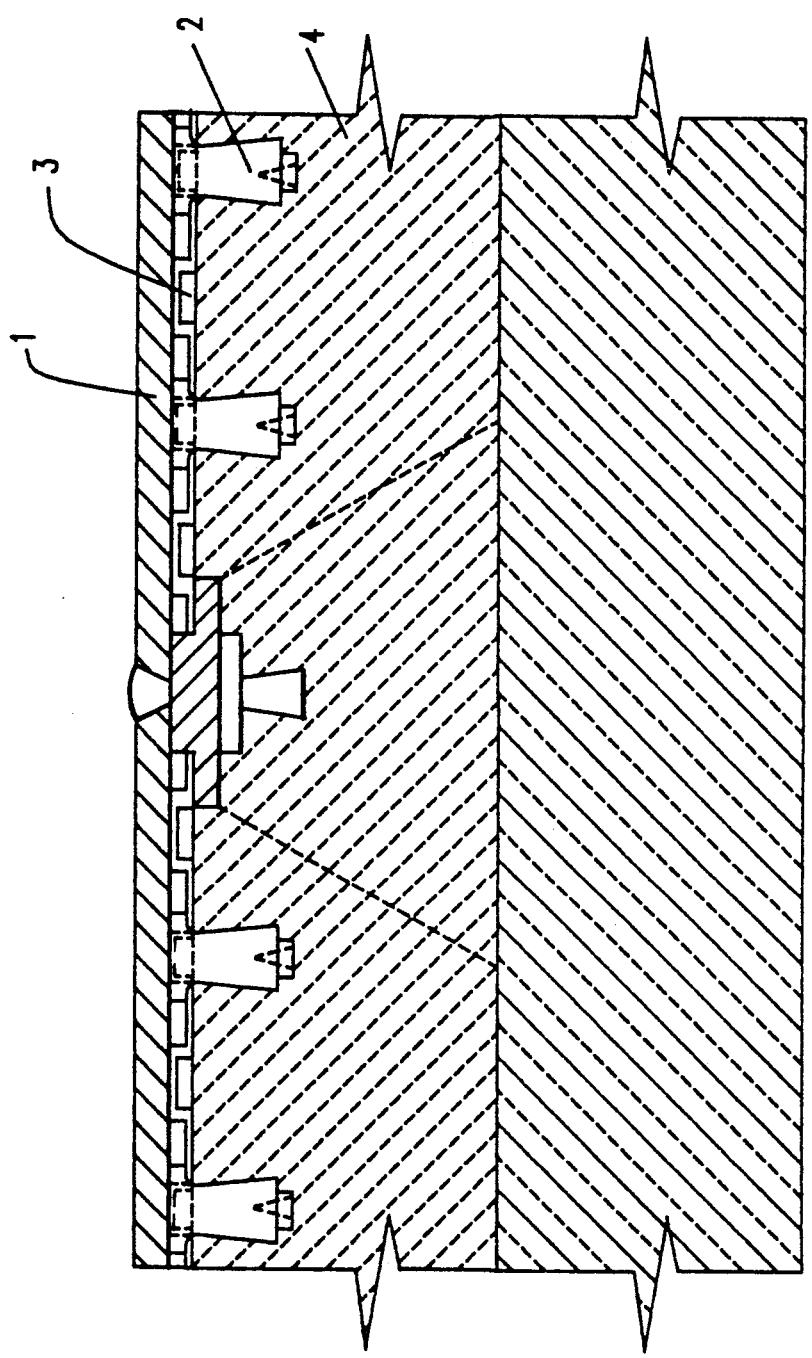
FIG. 6 is a cross-sectional view illustrating how a plurality of liner panels may be joined.

FIG. 5 shows an embodiment of the invention wherein leaked liquid (5) is drained via passage (8) around protrusions (7) into sump (15) which is connected via pipe (14) to a leak detector means (16), e.g., a conventional electronic moisture detector.

While preferred embodiments have been shown and described herein, it is not desired to limit the invention thereto. Changes and modifications therein may occur to those skilled in the art and possessed of the present disclosure, and such changes form a part of this invention insofar as they fall within the spirit and scope of the appended claims.

I claim:

1. A protective liner for a fluid containment structure comprising:
   a liner panel having a means for attachment to the structure disposed thereon,
   a flexible sheet having a plurality of openings therein through which the means for attachment disposed on the liner panel can pass into contact with the structure, and
   a spacer means disposed between the liner panel and the flexible sheet for providing a substantially continuous passage between the liner panel and the flexible sheet for leaked fluid.

2. The liner panel of claim 1, wherein the spacer means comprises a plurality of protrusions disposed on the flexible sheet.

3. A protective liner system comprising a plurality of protective liners of claim 1, wherein the protective liners include means for forming a fluid-tight seal with adjacent liners.

4. The protective liner of claim 1 wherein the structure comprises a rigid shell having a mortar bed for embedding the means for attachment therein.

5. The protective liner of claim 1 wherein the spacer means comprises a plurality of protrusions disposed on the flexible sheet.

6. A protective liner system comprising a plurality of protective liners of claim 1, wherein the protective liners include means for forming a fluid-tight seal with adjacent liners.

7. The protective liner of claim 1 wherein the spacer means comprises a plurality of protrusions disposed on the liner panel.

8. The protective liner of claim 1 wherein the means for attachment disposed on the liner panel comprises affixing knobs.

9. The protective liner of claim 8 wherein the means for attachment further comprise shoulders upon which the flexible sheet can rest to aid in forming the substantially continuous passage.

10. The protective liner of claim 9 wherein the structure comprises a rigid shell having a mortar bed for embedding the means for attachment therein.

11. The protective liner of claim 9 wherein the spacer means comprises a plurality of protrusions disposed on the liner panel.

12. The protective liner of claim 1 wherein the spacer means comprises a support webbing through which the attachment means can pass.

13. The protective liner of claim 8 wherein the spacer means comprises a support webbing through which the attachment means can pass.

14. A protective liner for a fluid containment structure comprising:
   a liner panel having a means for attachment to the structure disposed thereon,
   a flexible sheet fastened to the liner panel having a plurality of openings therein through which the means for attachment to the structure project, and
   a spacer means disposed between the liner panel and the flexible sheet for providing a substantially continuous passage between the liner panel and the flexible sheet for leaked fluid.

15. The protective liner of claim 14 wherein the spacer means comprises a plurality of protrusions disposed on the flexible sheet.

16. A protective liner system comprising a plurality of protective liners of claim 14, wherein the protective liners include means for forming a fluid-tight seal with adjacent liners.

17. The protective liner of claim 14 wherein the spacer means comprises a plurality of protrusions disposed on the liner panel.

18. The protective liner of claim 14 wherein the means for attachment disposed on the liner panel comprises affixing knobs.

19. The protective liner of claim 18 wherein the structure comprises a rigid shell having a mortar bed for embedding the means for attachment therein.

20. The protective liner of claim 18 wherein the means for attachment further comprise shoulders upon which the flexible sheet can rest to aid in forming the substantially continuous passage.

21. The protective liner of claim 20 wherein the spacer means comprises a plurality of protrusions disposed on the liner panel.

22. The protective liner of claim 14 wherein the spacer means comprises a support webbing through which the attachment means can pass.

23. The protective liner of claim 18 wherein the spacer means comprises a support webbing through which the attachment means can pass.

24. The protective liner of claim 14 wherein the structure comprises a rigid shell having a mortar bed for embedding the means for attachment therein.

25. A method for forming a substantially continuous passage between a flexible sheet and a liner panel, the passage being useful for leak detection and thermal insulation of a fluid containment structure, the structure comprising a rigid sheet having a mortar bed,
   the method comprising, in order, the steps of:
   a) preparing a protective liner for a fluid containment structure comprising:
      a liner panel provided with an attachment means disposed thereon for attaching the protective liner to the structure; and
      a flexible sheet provided with a spacer means for providing a substantially continuous passage for leaked fluid between the flexible sheet and the liner panel, the flexible sheet provided with a plurality of openings disposed therein through which the attachment means disposed on the liner panel pass into contact with the structure;
   b) mating the liner panel and the flexible sheet so that the attachment means disposed on the liner panel protrude through the openings in the flexible sheet; and
   c) attaching the attachment means protruding through the flexible sheet to the structure.

26. The method according to claim 25 wherein the spacer means comprise a plurality of protrusions disposed on the flexible sheet.

27. The method according to claim 25 wherein the means for attachment disposed on the liner panel comprises affixing knobs.

28. The method according to claim 27 wherein the means for attachment further comprise shoulders upon which the flexible sheet can rest to aid in forming the substantially continuous passage.

29. The method according to claim 25, wherein the attachment means are attached to the structure by embedding the attachment means therein.

30. The method according to claim 25, wherein the structure comprises a rigid shell having a mortar bed for embedding the means for attachment therein.

31. The method according to claim 25, wherein said passage has a thickness of from about 1 mm to about 20 mm.

32. The method according to claim 25, wherein said passage has a thickness of from about 5 mm to about 10 mm.

33. The method according to claim 26, wherein the height of the plurality of protrusions ranges from 1 to about 20 mm.

34. The method according to claim 26, wherein the height of the plurality of protrusions ranges from about 5 to about 10 mm.

* * * * *